(No Model)
W. F. DRAPER & E. S. STIMPSON.
THREAD CUTTING TEMPLE FOR LOOMS.
No. 585,465. Patented June 29, 1897.
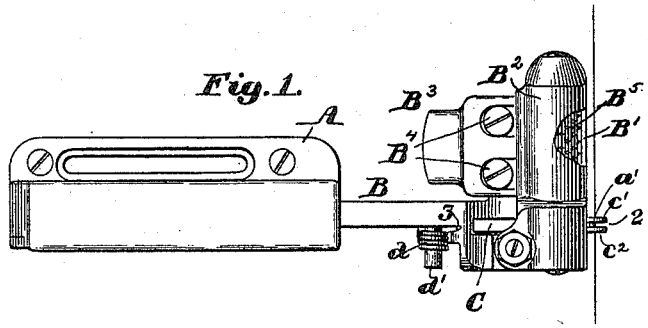
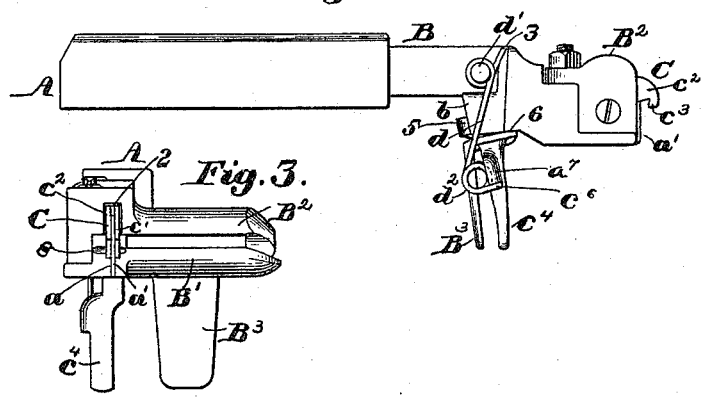
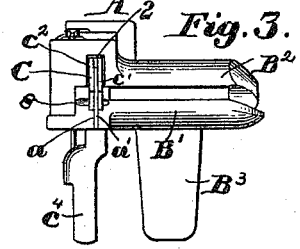
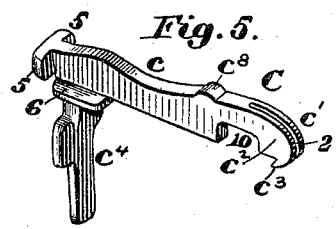
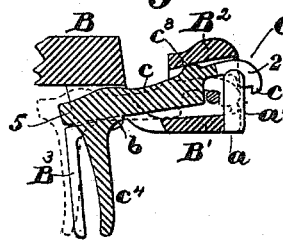
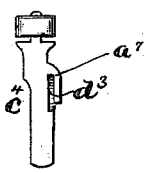
Witnesses:
Walter E. Lombard
Thomas J. Drummond
Inventors:
William F. Draper,
Edward S. Stimpson,
by Crosby & Gregory
Attys.

UNITED STATES PATENT OFFICE.

WILLIAM F. DRAPER AND EDWARD S. STIMPSON, OF HOPEDALE, MASSACHUSETTS, ASSIGNORS TO THE DUTCHER TEMPLE COMPANY, OF SAME PLACE.

THREAD-CUTTING TEMPLE FOR LOOMS.

SPECIFICATION forming part of Letters Patent No. 585,465, dated June 29, 1897.

Application filed January 7, 1897. Serial No. 618,217. (No model.)

*To all whom it may concern:*

Be it known that we, WILLIAM F. DRAPER and EDWARD S. STIMPSON, both of Hopedale, county of Worcester, State of Massachusetts, have invented an Improvement in Thread-Cutting Temples for Looms, of which the following description, in connection with the accompanying drawings, is a specification, like letters and figures on the drawings representing like parts.

In so-called "automatic looms," such as represented in United States Patent No. 529,940, dated November 27, 1894, wherein the filling is supplied to the shuttle in the shuttle-box while the loom is in action, the filling-carriers are supported above the shuttle-box and the outer end of the filling on the filling-carrier is connected to a filling-end holder, so that after the filling-carrier has been put into the shuttle and the shuttle thrown through the shed the said filling-thread, so held, will be automatically threaded into the delivery-eye of the shuttle. Each insertion of a new filling-carrier into a shuttle consequently leaves outside the selvage a filling end of from fifteen to twenty inches long, it leading from the selvage to the said filling-end holder. This filling end must be removed, else it is liable to be caught by subsequent shots of filling, making bunches at the selvage which damage the appearance of the goods and lessens its salable value in the market. Numerous attempts have been made to break or cut off these filling ends, but none of them so far known to us have been so completely successful as to promptly part or cut off the said filling, and the loom might sometimes run a dozen picks before the filling end was removed. In our experiments to provide a cutter which will operate promptly and unerringly to cut off this filling we ascertained that the filling end should be caught and cut before the temple carrying the cutter is moved toward the breast-beam as the lay beats in the filling. Accordingly we have devised a novel cutter-blade or cutter which we have mounted on or so as to move with the temple, and the cutter is so shaped that it normally stands in a plane outside the path of the filling end, and its movement is such that at each beat of the lay the cutter is moved so that it catches behind the filling end, if one is present, and the cutter, having engaged the filling end, is then moved toward the breast-beam to engage the thread between itself and the temple and cut the same, this cutting movement being substantially completed a little before the temple is ready to start with the lay toward the breast-beam. In this way the filling end when present is promptly cut off.

There are several peculiarities about our improved cutter which we will hereinafter more fully describe, and point out in the claims at the end of this specification.

Figure 1 is a top or plan view of a thread-cutting temple embodying our invention; Fig. 2, a side elevation thereof; Fig. 3, a front end elevation, the roller being omitted; Fig. 4, a partial section taken longitudinally through the cutter-blade or cutter and part of the temple. Fig. 5 shows the cutter-blade or cutter detached and enlarged, and Fig. 6 is a detail to be referred to.

The loom-temple, consisting of the stand A, adapted to be secured to the breast-beam of the loom, the slide-bar B, having the pod B', the cap $B^2$, the heel $B^3$, attached to the pod by screws $B^4$, and the toothed roller $B^5$ between the pod and cap and turning on usual pivots, are and may be all as usual, the said stand in practice containing a spring which surrounds the bar B to normally keep it pressed forward toward the lay, all in usual manner. The pod (see Figs. 3 and 4) is slotted at $a$ to receive a steel blade $a'$, said blade having, as shown in Fig. 3, an open space at both sides of it.

The shank or bar B has secured to or formed as part of it an ear $b$, which is slotted in continuation of the slot $a$. In the slot in the ear we insert the body $c$ of the thread-cutter C, the acting front end of the cutter being shown as slotted at 2 to leave two arms $c'$ $c^2$, each having a suitable hook $c^3$.

The slot 2 straddles the steel blade, and in its normal or inoperative position the acting end of the cutter is, by the action of a spring $d$, kept projecting through the slot $a$ and elevated as shown in Figs. 2 and 4.

The spring $d$ has near one end a coil which is fitted over a stud $d'$, extended from the bar B, the end 3 of the spring bearing against a part of the bar, but the opposite free end of the spring is bent into the form of a circular loop $d^2$, one edge of which enters a notch $d^3$ in the heel $c^4$ of the cutter, the end $c^6$ of the spring near the loop $d^2$ resting against a shoulder $a^7$ of the heel, said spring serving to retain the said cutter in its normal forward position, with its cutting end out of the plane of the filling end, and as herein shown elevated. By removing the loop of the spring from the notch $d^3$ the cutter may be readily removed to be cleaned or oiled.

The cutter has two forward stop-lugs 5 5 to limit the forward position of the cutter under the action of the spring $d$, and a shoe 6, which slides on the under side of the ear $b$, which under side is beveled or shaped, as shown in Fig. 2, to let the shoe both slide and rock, as it must do to operate in accordance with our invention. The shoe also receives the wear of the cutter and keeps the top side of the cutter from being worn.

The temple at its front edge (see Fig. 3) is cut or milled away each side the slot $a$ to leave grooves 8 to receive the filling end when the cutter acts on the same to sever it, said grooves obviating any liability of the cutter drawing the said ends into said groove $a$ during the operation of severing the end, for the cutting edge of the hooks $c^3$ are moved into the temple only substantially flush with the bottoms of said grooves, the edges of the steel plate standing outside the line of the bottom of the said grooves.

The body of the cutter at its upper side is provided with a projection $c^8$, which as the cutter rises under the action of the spring $d$ meets the bottom of the groove in the cap, (see Fig. 4,) thus preventing the slotted front end of the cutter from striking said cap and being battered or jammed to close the slot 2 in any way.

The cutter has near its front end a notch 10 to embrace the stud by which the roll $B^5$ is supported at one end.

In use the cutter herein shown will stand with its hooked end $c^3$ elevated and removed for a distance from the front of the blade $a'$, as represented in Figs. 2 and 4. As the lay comes forward at each beat, after filling has been thrown into the shed, the lay strikes the heel $c^4$ of the cutter, which immediately causes the hooked end to move from the position Figs. 2 and 4, placing the hook $c^3$ of the cutter behind the filling end, provided there is such an end between the selvage and the filling-end holder described, and the said hooked end having caught the filling end the slight further movement of the lay forward causes the cutter to be drawn into the temple-head, drawing the filling end across the steel blade and severing the same at that point, thus severing the thread usually before the lay meets the heel $b^3$ of the temple to move the latter and the cutter back for their full stroke. This cutting of the filling end is performed close to the selvage. The time at which the cutter operates is just before the reciprocation of the temple, and it is also just before the regular running filling-thread is beaten in, and hence the cutter described cannot catch that thread, but is always in position to operate upon the filling end extended from the selvage to the filling holder on the very first pick, severing it at such pick, so that the selvage is left clean and without any liability of being damaged by the filling end.

We have shown the temple cap and pod carried by a sliding bar, so that the temple is enabled to reciprocate; but this invention is not limited to the particular construction herein shown, as, instead, we may apply our invention to any other usual or suitable form of loom-temple.

The steel plate $a$ constitutes one blade of a cutting mechanism or apparatus.

In practice we have found that the cutting mechanism shown severs the thread before the temple is started back by the lay; but if for any reason the thread should not be cut at this exact time it will be cut while the temple and cutter are being moved toward the breast-beam together.

This invention is not limited to the exact shape shown for the body of the cutter and its hooks, and we should consider as within the scope of our invention any cutter having hooks which may be put into position behind the filling preparatory to cutting the same.

Having described our invention, what we claim, and desire to secure by Letters Patent, is—

1. A reciprocating temple provided with a blade, combined with a coöperating cutter-blade, and means to operate the same, to cut the filling end in advance of the reciprocation of the temple, substantially as described.

2. A reciprocating temple provided with a blade, combined with a coöperating cutter-blade having a hook, and means to operate the same, in advance of the reciprocation of the temple, said hook passing between the filling end and the reed, and when operated cutting off the filling end, substantially as described.

3. A temple having a blade and presenting a space each side said blade, combined with a coöperating cutter having a forked end provided with hooks, the said forked end straddling the said blade, and means to reciprocate said cutter in advance of said temple, substantially as described.

4. A temple having a blade, combined with a sliding cutter having a hook at one end and a heel at its opposite end, said cutter being free to slide in or with relation to said temple, substantially as described.

5. A temple having a blade, combined with a sliding cutter having a hook at one end and a heel at its opposite end, said cutter being free to slide in or with relation to said temple, and a spring to normally hold said cutter forward in or with relation to said temple, and with its hooked end elevated above the plane of the filling end, substantially as described.

6. A temple having a blade, combined with a sliding cutter having a hook at one end, and a heel at its opposite end having a shoe as to coöperate with the temple and receive wear, substantially as described.

7. A temple having a blade and presenting a space each side said blade, combined with a sliding cutter having a hook at one end and a heel at its opposite end, said cutter being free to slide in or with relation to said temple, and having at its upper side a projection to contact with the temple and prevent injury to the slotted end of the cutter, substantially as described.

8. A temple provided with a plate, combined with a cutter, having a hooked end adapted to engage the filling end at its rear side, and means to move said cutter vertically and slide the same in the temple during the cutting operation, substantially as described.

9. A temple, and a cutter, having a hooked end and free to be moved vertically and to slide in said temple during the thread-cutting operation, combined with a spring connected to said temple and coöperating with said cutter, to normally keep the cutter in its forward inoperative position, substantially as described.

10. A temple and its sliding thread-cutter provided with a heel having a notch and a shoulder, combined with a spring connected to said temple and shaped substantially as described, whereby a portion of said spring may enter said notch, the end of the spring engaging the shoulder of the heel, as and for the purposes set forth.

In testimony whereof we have signed our names to this specification in the presence of two subscribing witnesses.

WILLIAM F. DRAPER.
EDWARD S. STIMPSON.

Witnesses:
FRANK J. DUTCHER,
GEO. E. STIMPSON.